(12) United States Patent
Doublet

(10) Patent No.: US 8,040,281 B2
(45) Date of Patent: Oct. 18, 2011

(54) RADIOFREQUENCY DEVICE

(75) Inventor: Pierre Doublet, Saint Brice (FR)

(73) Assignee: Arjowiggins Security, Issy les Moulineaux (FR)

( * ) Notice: Subject to any disclaimer, the term of this patent is extended or adjusted under 35 U.S.C. 154(b) by 325 days.

(21) Appl. No.: 12/293,052

(22) PCT Filed: Mar. 23, 2007

(86) PCT No.: PCT/FR2007/000511
§ 371 (c)(1),
(2), (4) Date: Mar. 20, 2009

(87) PCT Pub. No.: WO2007/118962
PCT Pub. Date: Oct. 25, 2007

(65) Prior Publication Data
US 2009/0295673 A1   Dec. 3, 2009

(30) Foreign Application Priority Data

Mar. 24, 2006   (FR) ..................................... 06 51028

(51) Int. Cl.
*H01Q 1/38* (2006.01)
*H01Q 11/12* (2006.01)
*H01Q 7/00* (2006.01)
(52) U.S. Cl. .................. 343/700 MS; 343/741; 343/866

(58) Field of Classification Search ........... 343/700 MS, 343/866, 867, 741, 742; 340/572.1, 572.7, 340/572.8
See application file for complete search history.

(56) References Cited

U.S. PATENT DOCUMENTS

| 6,378,774 | B1 | 4/2002 | Emori et al. |
| 6,404,643 | B1 * | 6/2002 | Chung .......................... 361/737 |
| 6,496,113 | B2 * | 12/2002 | Lee et al. .................... 340/572.7 |
| 6,774,865 | B1 | 8/2004 | Serra |
| 2004/0046663 | A1 | 3/2004 | Jesser |

FOREIGN PATENT DOCUMENTS

| CH | 669 079 | A5 | 2/1989 |
| EP | 1 031 939 | A1 | 8/2000 |

* cited by examiner

*Primary Examiner* — Hoang V Nguyen
(74) *Attorney, Agent, or Firm* — Oliff & Berridge, PLC

(57) ABSTRACT

The present invention relates to a radiofrequency device (1) comprising: at least one sheet (2) of a substrate, and at least one wire booster aerial (3), formed with an electrically insulated conductor wire, comprising at least one turn, and having two ends connected to each other electrically in a connection zone (10).

46 Claims, 3 Drawing Sheets

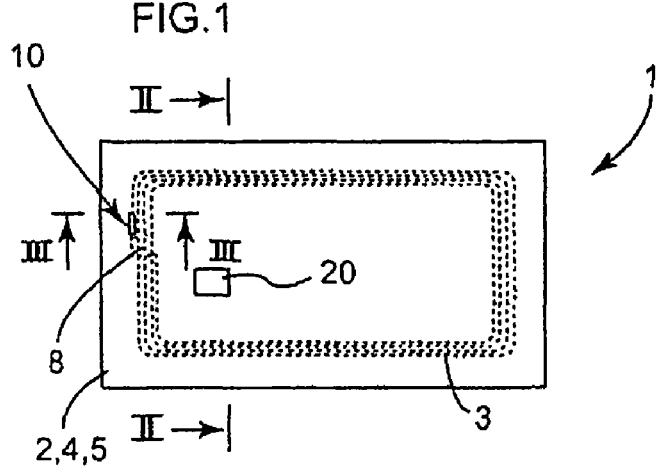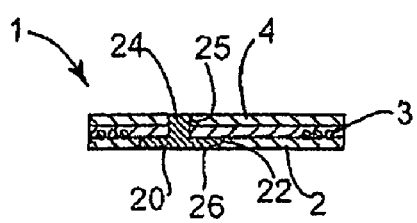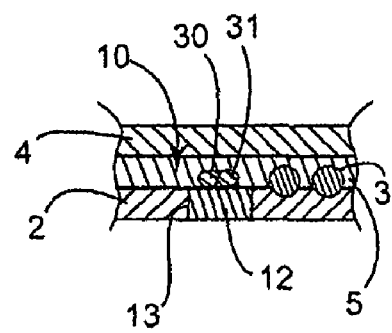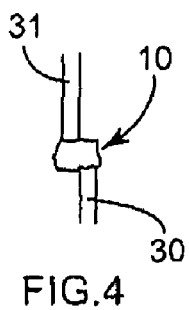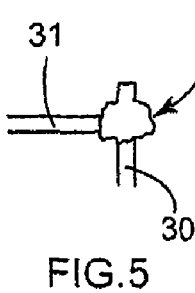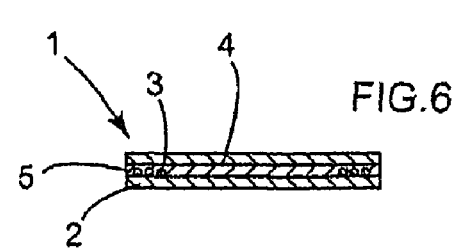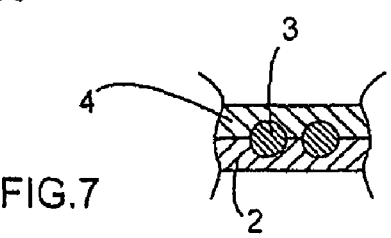

Figure 18:
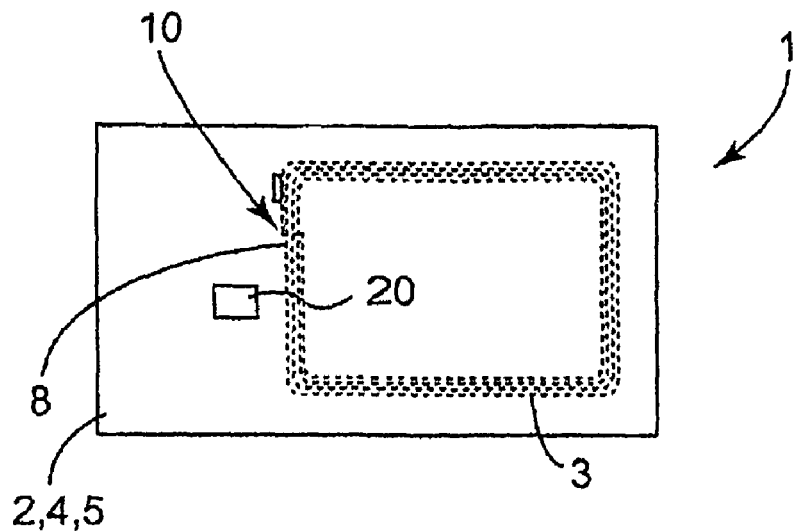

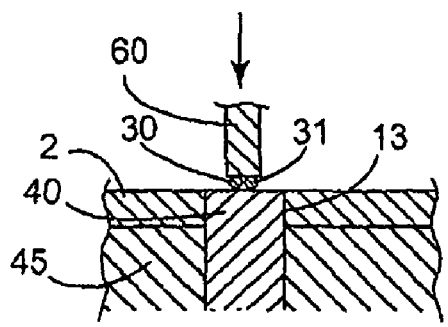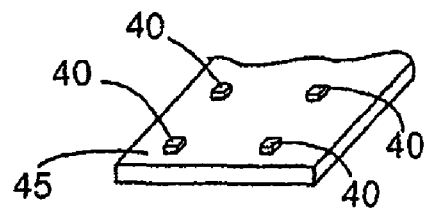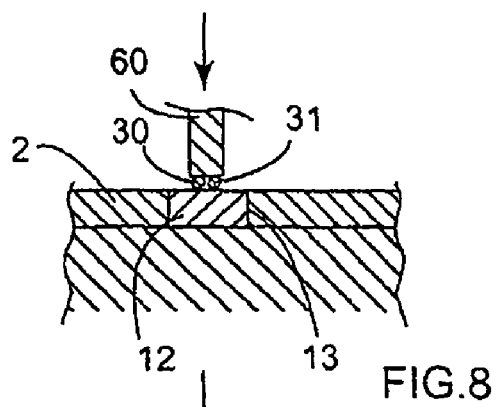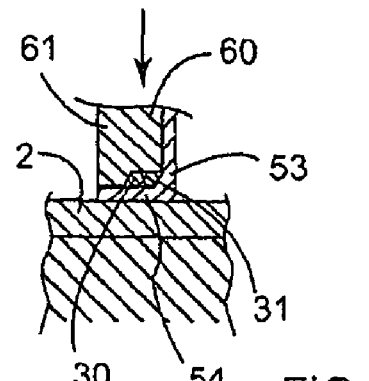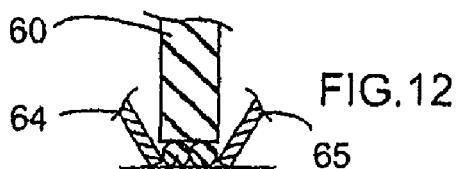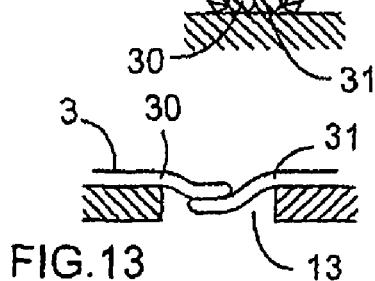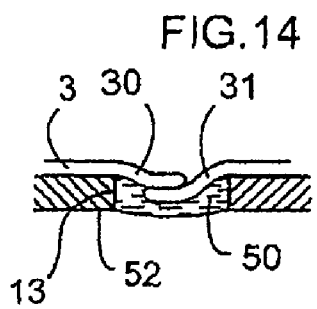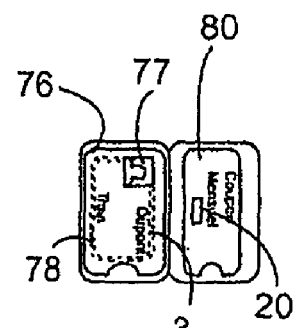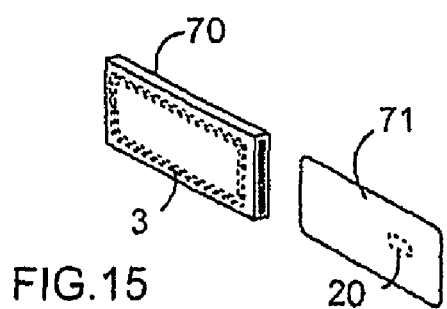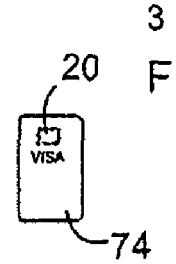

RADIOFREQUENCY DEVICE

The present invention relates to radiofrequency devices (RE devices) and more particularly those comprising an electronic component provided with an integrated antenna, electromagnetically coupled to an amplification antenna, called a "booster" antenna.

Patent application EP 1 031 939 discloses a RF device comprising an electronic component and several antennas.

Such RF devices are widely known.

The presence of the booster antenna makes it possible to increase the range of radio interchange.

To the applicant's knowledge, booster antennas are produced only by etching or screen printing.

In order to electrically close the antenna, these techniques require the connecting of the ends of the latter via a strap (conductive bridge) which must pass through the turns of the antenna and therefore be insulated from the latter.

In the case of screen printing, the insulation is obtained by means of a layer of an insulator which is deposited on the turns before the strap is formed, during a second screen printing pass.

In the case of the etched antenna, the strap may be mechanically fitted. It then usually consists of an insulating layer made of plastic on which a conductive layer is deposited, the electrical conduction being provided by placing in mechanical contact, particularly swaging, or by the use of a conductive adhesive.

The manufacture of these antennas is therefore relatively complex; it requires several operations on the same machine, and even several machines.

In addition, their reliability is insufficient in the event of prolonged use when they are attached to a substrate that may undergo considerable deformations, because the ohmic resistance of the conductive tracks tends to increase in the mechanically stressed regions, which then adversely affects the performance of the antenna.

It is also known practice to produce wire antennas by depositing an electrically insulated wire on a sheet of a substrate and to connect the ends of this wire to an electronic component such as a module. The connection to the module is achieved by thermocompression, with creation of an electric arc which causes a local melting of material and a local destruction of the insulation of the wire, or by soldering with solder.

There is a need to further enhance the RB devices comprising a booster antenna.

The subject of the invention is therefore a RF device comprising:
  at least one sheet of a substrate,
  at least one wire booster antenna formed with an electrically insulated conductor wire, comprising at least one turn, and having two ends electrically connected together.

These two ends may be connected while being assembled directly to one another or may be connected by means of a fitted element, which is for example a conductor element having a low electric resistivity, advantageously at least partially metallic.

Thanks to the invention, the manufacture of the antenna may be simplified because it is no longer necessary, since the wire is insulated, to produce the successive deposit of a layer of an insulator and a strap in order to electrically close the antenna.

In addition, the use of a wire and not of a conductive track formed by screen printing or etching increases the reliability in the event of considerable mechanical stress of the substrate.

The ends of the antenna may be connected together in a connection zone which is advantageously at a distance from the substrate, thanks for example to the presence in the sheet of substrate of a recess in which the connection zone is situated.

By "at a distance from the substrate", it must be understood that the connected ends of the antenna in the connection zone are not in contact with the substrate. They may come into contact with a filler material fitted to the substrate.

Therefore, the sheet of substrate is not damaged during soldering of the antenna ends.

The aforementioned conductive element may be placed in the recess, the ends of the wire being connected to this conductive element.

The recess may or may not pass through the sheet of substrate.

In one exemplary embodiment of the invention, the recess is filled with a filler material, which comprises for example a resin. This may make it possible to enhance the external appearance of the sheet of substrate once the ends of the antenna wire are connected together.

The connection zone may be situated on the periphery of the antenna, which may enhance the quality of electromagnetic coupling with the electronic component, or elsewhere.

The ends of the antenna wire that are connected together may be oriented substantially parallel or, as a variant, be oriented substantially perpendicularly.

The ends of the antenna wire may be connected without the addition of material, or with addition of material, particularly addition of a metal alloy.

The connected ends may be flattened, which makes it possible to limit the extra thickness that is if necessary generated in the connection zone.

The antenna wire may be an enameled wire, particularly a copper-enameled wire. This wire may have a circular section, the diameter of the wire being for example less than or equal to 100 μm, better to 80 μm.

The device may comprise at least one covering layer covering the antenna, on the side opposite to the sheet of substrate. This covering wire may be coated, on its face turned toward the antenna, with an adhesive.

The antenna wire may be at least partially buried in the sheet of the substrate and/or in the covering layer. This burying may result for example from the technique used for placing the antenna wire on the sheet of substrate.

The burying may result from the exposure of the wire and the sheet of substrate to ultrasound vibrations.

At least one of the sheet of substrate and the covering layer may comprise fibers, which may comprise paper fibers, for example cellulose fibers.

The RF device may have no electronic component. As a variant, the RF device may comprise an electronic component provided with an integrated antenna, electromagnetically coupled via a contactless link to the booster wire antenna.

The electronic component may comprise a chip attached to a substrate on which the integrated antenna is produced, such a component also being called an antenna module. The electronic component may also be a chip already having its antenna on the silicon, a flexible or rigid inlay, a prelam or a card with a plastic base in particular.

The sheet of substrate may comprise at least one recess in which the electronic component is at least partially engaged. This may make it possible to reduce the thickness of the RF device.

The electronic component may have a stepped shape with a widened base portion. The sheet of substrate may comprise a recess receiving this base portion, the thickness of the sheet of substrate being able to correspond substantially to that of the base portion.

The electronic component may be situated inside or outside the turns of the booster antenna, when the latter is observed from above. The turns of the antenna may extend substantially in one plane.

The electronic component and the booster antenna may belong to the same sheet of substrate or be made on different sheets.

A further subject of the invention is an assembly comprising:
  a RF device as defined above, with no electronic component electromagnetically coupled to the booster antenna, and
  at least one electronic component that is able to be separated from the RF device and that comprises an integrated antenna that is able to be electromagnetically coupled to the booster antenna.

The RF device may be integrated into a first article and the electronic component may be integrated into a second article able to be attached to the first so as to achieve the electromagnetic coupling between the integrated antenna of the electronic component and the booster antenna of the REF device. The second article may be able to be separated from the first, if necessary.

The first and second articles may be security documents. The first article may for example be a passport and the second article a visa designed to be bonded or stapled to this passport.

The first article may also be a card for identification, payment or subscription and the second article a temporary coupon for validation of the card.

The first article may also be a card-holder and the second article a card arranged in order to be housed in the cardholder.

A further subject of the invention is a method for manufacturing a RF device, comprising the following steps:
  placing on at least one sheet of a substrate an electrically insulated wire so as to form at least one turn of a wire antenna,
  electrically connecting two ends of the antenna together by local melting of material, the ends being, during this connection, sufficiently distant and/or thermally insulated from the substrate in order to prevent damaging the latter.

The connection of the ends may take place in or above a recess of the sheet of substrate, which makes it possible to prevent a contact of the substrate with the high temperature material during the connection.

An electric conductive element may be placed in the recess of the substrate and the connection of the ends may be achieved by means of this conductive element or on the latter.

For example, the two ends of the antenna wire may be soldered to the conductive element, which electrically closes the antenna, or as a variant be soldered together and to the conductive element, the latter then playing no electrical role.

The connection of the ends of the antenna wire may also be carried out against an anvil of a support on which the sheet of the substrate may be placed, through the recess. This anvil is for example a wearing part fitted to the support, and may protrude on the support, so as to be engaged at least partially in the recess.

The connection may also be achieved after inserting an anvil between the ends to be connected and the sheet of substrate. The aforementioned recess may in this case notably be deleted.

The ends to be connected may be oriented in parallel and held clamped laterally against one another during the connection, or be substantially perpendicular before the connection.

The antenna wire may be placed on the substrate with at least partial varying in the latter, by local melting of the sheet of substrate.

The thickness of the antenna wire may be partially or completely compensated for by the adhesive(s) and assembly materials.

A recess may make possible the partial or total compensation for the thickness of the electronic component when the latter is present, in order to prevent it from protruding.

Figure 19:
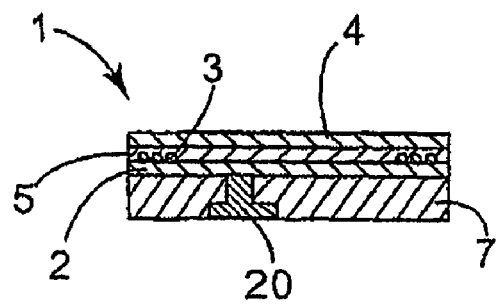
Figure 20:
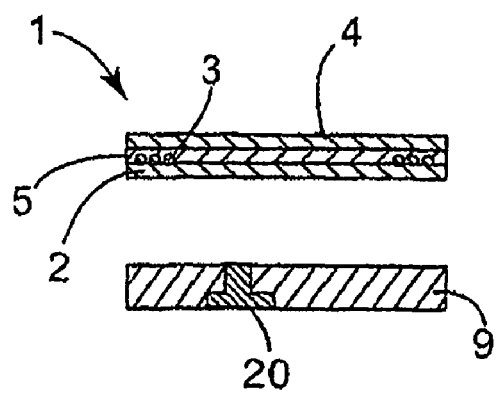

The invention may be better understood on reading the detailed description that follows of nonlimiting exemplary embodiments of the latter, and on examining the appended drawing in which:

FIG. 1 represents in a top view, in a schematic manner, an example of inlay produced according to the invention, FIG. 2 is a schematic section along II-II of FIG. 1, FIG. 3 is a partial section on an enlarged scale along III-III of FIG. 1, FIGS. 4 and 5 are top views representing exemplary orientations amongst others of the connected ends of the antenna, FIG. 6 is a view similar to FIG. 2 of a variant embodiment of the invention, FIG. 7 is a view similar to FIG. 3 of a variant embodiment of the invention, FIGS. 8 to 12 illustrate various possibilities of embodiment of the connection of the ends of the antenna, FIG. 10 represents a support that is able to be used in the context of achieving the connection according to FIG. 9, FIGS. 13 and 14 illustrate the filling of the recess situated in the connection zone with a filler material, and FIGS. 15 to 17 represent various examples of assemblies achieved with a RF device according to the invention, FIG. 18 is a view similar to FIG. 1 of another exemplary embodiment of the invention, and FIGS. 19 and 20 are views similar to FIG. 2 of other exemplary embodiments of the invention.

In the figures, the relative proportions of the various elements represented have not always been observed, for the purpose of clarity of the drawing.

FIGS. 1 to 3 represent an inlay 1 comprising a sheet 2 of a substrate, an antenna 3 and a covering layer 4 coated on its surface turned toward the sheet 2 with a layer 5 of an adhesive.

The antenna 3 is a wire antenna, being formed by the winding on the sheet 2 of an enameled copper wire, in order to form several concentric turns.

In a region 8, the wire 3 of the antenna passes through the turns in order to allow the two ends of the wire to join in a connection zone 10 situated on the periphery of the antenna.

In the example in question, the ends of the wire are connected together on a conductive element 12, which is for example metallic and received in a recess 13 of the sheet 3, as can be seen in FIG. 3.

The ends of the wire of the antenna are for example assembled together by thermocompression, thanks to a thermocompression device which makes it possible to raise the wire to a temperature sufficient to cause it to melt.

The wire used is for example an enameled copper wire and the soldering by thermocompression makes it possible to locally destroy the enamel.

The RF device also comprises an electronic component 20, for example an RFID device, which includes an integrated antenna, electromagnetically coupled to the booster antenna 3.

The electronic component 20 may be situated inside the turns, as illustrated in FIG. 1, in a location that is for example determined so as to optimize the electromagnetic coupling with the booster antenna 3.

As a variant, as illustrated in FIG. 18, the electronic component 20 may be situated outside the turns.

The electronic component 20 may be an antenna module or an inlay, capable where necessary of operating in a standalone manner, comprising a substrate on which the integrated antenna is produced, for example by etching or screen printing, and which is connected to the chip, the latter being for example of the flip chip type, arranged so as to allow a connection with the substrate by contact when it is deposited.

The electronic component 20 may comprise at least one memory and a processor making it possible to read and/or write in the memory, the antenna module may comprise a microprocessor notably.

If necessary, the electronic component 20 may comprise at least one sensor of at least one environmental condition, for example a sensor of humidity, temperature, relative humidity, light, or be sensitive to an outside stimulus, for example the presence of a compound or an organism.

The electronic component 20 may also, if necessary, comprise at least one liquid crystal or light emitting visual indicator, and/or a fingerprint sensor.

The electronic component 20 may comprise, as illustrated, a widened base portion 26 whose thickness corresponds substantially to that of the sheet of the substrate, that is received in recess 22 of the sheet 2, the upper portion 24 of the component 20 being received in a recess 25 of the covering layer 4 and of the adhesive layer 5.

The total thickness of the sheet 2, the covering layer 4 and the adhesive layer 5 may correspond substantially to the total height of the electronic component 20, such that the inlay 1 has a substantially uniform thickness over the whole of its extent.

Preferably, the connection zone 10 is situated on the outer periphery of the antenna, but in a variant not illustrated, this connection zone 10 may be inside the turns. The presence of the connection zone 10 on the periphery of the antenna 10 may enhance the homogeneity of the electromagnetic coupling with the integrated antenna of the electronic component 20.

The ends 30 and 31 of the wire of the antenna 3 may be oriented substantially in parallel when they leave the connection zone 10, as illustrated in FIG. 4, or arrive in parallel from the same direction.

As a variant, as illustrated in FIG. 5, these ends 30 and 31 may be oriented substantially perpendicularly.

In the example represented in FIG. 19, the electronic component 20 is received in a layer 7 forming part of the inlay 1.

The inlay 1 may be produced without the electronic component 20, the latter then being outside the inlay 1, as illustrated in FIG. 6.

In a variant represented in FIG. 20, the electronic component is received in a layer 9 that does not form part of the inlay 1.

Whether or not the electronic component 20 is present, the inlay may comprise the sheet 2 and the covering layer 4 without the intermediate layer 5 of adhesive, as illustrated in FIG. 7. The antenna wire 3 may, in this case, notably be at least partially buried in the sheet 2 and/or in the covering layer 4 so as not to generate excessive extra thickness above the antenna 3.

The assembly of the ends 30 and 31 of the antenna may be carried out in various ways.

When a fitted element 12 is present in a recess 13 of the sheet 2, as illustrated in FIG. 8, the thermocompression may be carried out against this fitted element 12, which is designed to withstand the heat generated during assembly. The fitted element 12 is for example a metal element, for example a copper plate.

The ends 30 and 31 may be assembled each to the conductive element 12 without being assembled directly together. As a variant, the ends 30 and 31 may be assembled together without being assembled to the fitted element 12, the latter serving as an anvil during the thermocompression and possibly not being electrically conductive. As a further variant, the ends 30 and 31 may be assembled together and to the fitted element 12.

The sheet 2 may also have no fitted element 12 and the assembly of the ends 30 and 31 may be carried out through the recess 13 against an anvil 40 which protrudes on a support 45 on which the sheet 2 rests.

The support 45 may comprise, as necessary, several anvils 40, as illustrated in FIG. 10, particularly when several inlays are produced from one and the same sheet 2.

Each anvil 40 is for example designed to be able to be attached removably to the support 45, in order to serve as a wearing part.

Each anvil 40 is for example made of a temperature-resistant ceramic.

Once the ends 30 and 31 are assembled, as illustrated in FIG. 13, a filler material 50 may be inserted into the recess 13, as illustrated in FIG. 14, in order to prevent the presence of a hole on the face 52 of the inlay opposite to the covering layer 4.

The assembly of the ends 30 and 31 may also be carried out with insertion between the sheet 2 and the ends 30 and 31 of an anvil 53 whose foot 54 engages under the ends 30 and 31. The thermocompression tool 60 may comprise, as necessary, one or more inclined faces 61 making it possible to laterally compress the two ends 30 and 31 against one another.

If necessary, as illustrated in FIG. 12, the thermocompression tool 60 may press on the ends 30 and 31 while the latter are held laterally by two jaws 64 and 65.

The invention applies to the production of an inlay that may or may not comprise, as has just been described, an electronic component 20 including an integrated antenna electromagnetically coupled to the booster antenna.

When the inlay comprises the electronic component 20, the latter may for example be integrated into an article, for example a security document, by replacing the conventional inlays comprising a wire antenna whose ends are electrically connected to an electronic chip or to a module.

The invention may also be applied by placing the booster antenna 3 on a first article and the electronic component 20 on a second article.

The first article is for example a card-holder 70 as illustrated in FIG. 15, the electronic component 20 being supported by a card 71 designed to be inserted into the card-holder 70. Therefore, the card-holder 70 may provide additional security against unauthorized use of the card 71, making it more difficult to use the latter in the absence of the card-holder 70.

The first article comprising the booster antenna 3 may also be a passport 73, the booster antenna 3 being for example integrated in the cover of the passport. The second article may be a visa 74 comprising the electronic component 20. The booster antenna 3 of the passport makes it possible to read information contained in the electronic component 20 of the visa.

The first article may also be, as illustrated in FIG. 17, a card 76 for identification, payment or subscription, comprising for example a photograph of the user and received in one of the flaps of a case 78 comprising two flaps. The second flap may receive a temporary coupon 80 incorporating the electronic component 20 whose integrated antenna is electromagnetically coupled to the booster antenna 3 of the card 76 when the case 78 is closed.

Naturally, the invention is not limited to the exemplary embodiments that have just been described.

In particular, the sheet 2 of substrate may be of any type, comprising for example a film made of plastic and plies of paper.

If necessary, the sheet 2 of substrate may have a composite structure and comprise at the same time at least a plastic and paper fibers.

The sheet 2 of substrate may comprise cellulose fibers.

The covering layer 4 may have other structures, comprising for example a plastic film and/or one or more plies of paper.

The expression "comprising one" must be understood as being synonymous with "comprising at least one", unless it is specified to the contrary.

The invention claimed is:

1. A RF device comprising:
    at least one sheet of a substrate,
    at least one wire booster antenna placed on said at least one sheet of the substrate, formed with an electrically insulated conductor wire, comprising at least one turn, having two ends in contact with each other and electrically connected together in a connection zone by local melting of material, said two ends not being in contact with said at least one sheet of the substrate.

2. The RF device according to claim 1, said at least one sheet of the substrate comprising paper fibers.

3. The device as claimed in claim 2, said at least one sheet of the substrate comprising cellulose fibers.

4. The device as claimed in claim 1, said at least one sheet of the substrate comprising, in the connection zone, a recess.

5. The device as claimed in claim 4, a fitting element being placed in the recess.

6. The device as claimed in claim 5, the ends of the wire being connected to the fitted element.

7. The device as claimed in claim 6, the fitted element being metallic.

8. The device as claimed in claim 5, the recess passing through said at least one sheet of the substrate.

9. The device as claimed in claim 4, the recess being filled with a filler material.

10. The device as claimed in claim 9, the filler material comprising a resin.

11. The device as claimed in claim 1, the connection zone being situated on the periphery of the antenna.

12. The device as claimed in claim 1, the connected ends of the antenna wire being oriented substantially parallel.

13. The device as claimed in claim 1, the connected ends of the antenna wire being oriented substantially perpendicularly.

14. The device as claimed in claim 1, the ends of the antenna wire being connected without added material.

15. The device as claimed in claim 1, the connected ends of the antenna wire being flattened.

16. The device as claimed in claim 1, the ends of the antenna wire being connected so as not to generate substantial extra thickness.

17. The device as claimed in claim 1, the wire being enameled and electrically insulated.

18. The device as claimed in claim 1, the wire comprising copper.

19. The device as claimed in claim 1, the wire having a circular section.

20. The device as claimed in claim 1, the diameter of the wire being less than or equal to 100 μm.

21. The device as claimed in claim 1, comprising at least one covering layer covering the antenna on the side opposite to said at least one sheet of the substrate.

22. The device as claimed in claim 21, the covering layer being coated, on its face turned toward the antenna, with an adhesive.

23. The device as claimed in claim 21, the antenna being at least partially sunk into said at least one sheet of the substrate and/or into the covering layer.

24. The device as claimed in claim 21, the covering layer comprising fibers.

25. The device as claimed in claim 24, the fibers comprising paper fibers.

26. The device as claimed in claim 25, the paper fibers comprising cellulose fibers.

27. The device as claimed in claim 1, having no electronic component electromagnetically coupled to the booster antenna.

28. The device as claimed in claim 1, comprising an electronic component electromagnetically coupled to the wire antenna.

29. The device as claimed in claim 28, said at least one sheet of the substrate comprising at least one recess in which the electronic component is at least partially engaged.

30. The device as claimed in claim 29, the electronic component having a stepped shape with a widened base portion, said at least one sheet of the substrate comprising a recess receiving the widened base portion.

31. The device as claimed in claim 30, the thickness of said at least one sheet of the substrate corresponding substantially to that of the base portion of the electronic component.

32. The device as claimed in claim 28, the electronic component being situated inside the turn or turns of the antenna.

33. The device as claimed in claim 28, the electronic component being situated outside the turn(s) of the antenna.

34. An assembly comprising:
    a RF device as defined in claim 1, with no electronic component coupled to the wire antenna, and
    at least one electronic component being able to be separated from the RF device and comprising an integrated antenna being able to be electromagnetically coupled to the wire antenna.

35. The assembly as claimed in claim 34, the RF device being integrated into a first article and the electronic component being integrated into a second article being able to be attached to the first so as to produce an electromagnetic coupling between the integrated antenna of the electronic component and the wire antenna of the RF device.

36. The assembly as claimed in claim 35, the first article being a passport and the second article a visa.

37. The assembly as claimed in claim 35, the first article being a card for identification, subscription or payment and the second article being a temporary coupon for validation of the card.

38. The assembly as claimed in claim 35, the first article being a card-holder and the second article a card arranged in order to be housed in the card-holder.

39. A method of manufacturing a RF device, comprising:
    placing on at least one sheet of a substrate an electrically insulated wire so as to form at least one turn of a wire booster antenna, electrically connecting two ends of the antenna in contact with each other together by local melting of material, the ends being, during this connection, not in contact with said at least one sheet of the substrate in order to prevent damaging of said at least one sheet of the substrate.

40. The method as claimed in claim 39, wherein the connection of the ends takes place in or above a recess of said at least one sheet of the substrate.

41. The assembly as claimed in claim 40, wherein a fitted element is placed in the recess and wherein the connection of the ends is achieved by means of this element.

42. The assembly as claimed in claim 39, wherein the connection is achieved against an anvil of a support on which said at least one sheet of the substrate is placed.

43. The method as claimed in claim 39, wherein the connection is achieved after an anvil is inserted between the ends to be connected and said at least one sheet of the substrate.

44. The method as claimed in claim 39, wherein the antenna wire is placed on the substrate with at least partial burying in the latter.

45. The method as claimed in claim 39, wherein the ends to be connected are oriented parallel with one another and held clamped one against the other during the connection.

46. The method as claimed in claim 39, wherein the ends to be connected are oriented substantially perpendicularly with one another before the connection.

* * * * *